US012566806B2

(12) United States Patent
Park

(10) Patent No.: US 12,566,806 B2
(45) Date of Patent: Mar. 3, 2026

(54) STORAGE DEVICE SEARCHING FOR MAP SEGMENTS STORED IN PLURALITY OF SEARCH ENGINES, AND METHOD FOR OPERATING STORAGE DEVICE

(71) Applicant: SK hynix Inc., Icheon-si (KR)

(72) Inventor: Sung Jin Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/611,337

(22) Filed: Mar. 20, 2024

(65) Prior Publication Data

US 2025/0165540 A1     May 22, 2025

(30) Foreign Application Priority Data

Nov. 20, 2023     (KR) ......................... 10-2023-0160036

(51) Int. Cl.
*G06F 16/951*          (2019.01)
*G06F 16/25*          (2019.01)
*G06F 16/29*          (2019.01)

(52) U.S. Cl.
CPC .......... *G06F 16/951* (2019.01); *G06F 16/256* (2019.01); *G06F 16/29* (2019.01)

(58) Field of Classification Search
CPC ...... G06F 16/951; G06F 16/256; G06F 16/29; G06F 16/24552; G06F 2212/608; G06F 12/0868; G06F 12/0238; G06F 12/023; G06F 3/0629; G06F 2212/45; G06F 13/1668; G06F 2212/60; G06F 12/0873
USPC ........................................... 707/711
See application file for complete search history.

(56) References Cited

U.S. PATENT DOCUMENTS

| | | | | |
|---|---|---|---|---|
| 2008/0195802 | A1* | 8/2008 | Lee | G06F 12/0246 |
| | | | | 707/E17.014 |
| 2017/0017588 | A1* | 1/2017 | Frid | G06F 3/061 |
| 2020/0272577 | A1* | 8/2020 | Zeng | G06F 12/1018 |
| 2020/0310987 | A1* | 10/2020 | Choi | G06F 12/1027 |
| 2021/0064521 | A1* | 3/2021 | Cho | G06F 12/0873 |

FOREIGN PATENT DOCUMENTS

| | | |
|---|---|---|
| KR | 10-2008-0075618 A | 8/2008 |
| KR | 10-2021-0132806 A | 11/2021 |

* cited by examiner

*Primary Examiner* — Evan Aspinwall

(57) ABSTRACT

A storage device may include a plurality of search engines each capable of storing a plurality of map segments. Each of the map segments may indicate a respective mapping relationship between a logical address area and a physical address area. A search engine manager of the storage device may determine, from among map segments stored in the plurality of search engines, N number of target map segments respectively corresponding to N number of target logical address areas. A controller of the storage device may read data corresponding to the N number of target logical address areas on the basis of the N number of target map segments.

20 Claims, 13 Drawing Sheets

MAP_SEG(updated)

STORAGE DEVICE SEARCHING FOR MAP SEGMENTS STORED IN PLURALITY OF SEARCH ENGINES, AND METHOD FOR OPERATING STORAGE DEVICE

CROSS-REFERENCE TO RELATED APPLICATION

The present application claims priority under 35 U.S.C. § 119(a) to Korean Patent Application No. 10-2023-0160036 filed in the Korean Intellectual Property Office on Nov. 20, 2023, which is incorporated herein by reference in its entirety.

BACKGROUND

1. Technical Field

Various embodiments of the disclosed technology generally relate to a storage device which searches for map segments stored in a plurality of search engines, and a method for operating a storage device.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

In order to read data stored in the memory, the storage device may search for map segments which indicate the mapping relationships between logical address areas and physical address areas for the data. In order to more quickly search for the map segments, the storage device may use a plurality of search engines.

SUMMARY

Various embodiments of the disclosed technology are directed to providing a storage device and an operating method thereof, capable of minimizing an overhead occurring in the process of searching for map segments from a plurality of search engines.

In an aspect, a storage device may include: i) a memory configured to store data; ii) a plurality of search engines each configured to be able to store a plurality of map segments, each of the map segments indicating a respective mapping relationship between a logical address area and a physical address area; iii) a search engine manager configured to determine, from among map segments stored in the plurality of search engines, N (N is a natural number) number of target map segments respectively corresponding to N number of target logical address areas corresponding to the data; and iv) a controller configured to read the data from the memory on the basis of the N number of target map segments.

In another aspect, a method for operating a storage device may include: i) requesting N (N is a natural number) number of target map segments indicating N number of target logical address areas corresponding to data stored in a memory; ii) determining the N number of target map segments from among map segments stored in a plurality of search engines each capable of storing a plurality of map segments, each of the map segments indicating a respective mapping relationship between a logical address area and a physical address area; and iii) reading the data from the memory on the basis of the N number of target map segments.

According to the embodiments of the disclosed technology, it is possible to minimize an overhead occurring in the process of searching for map segments from a plurality of search engines.

DETAILED DESCRIPTION

Figure 1:
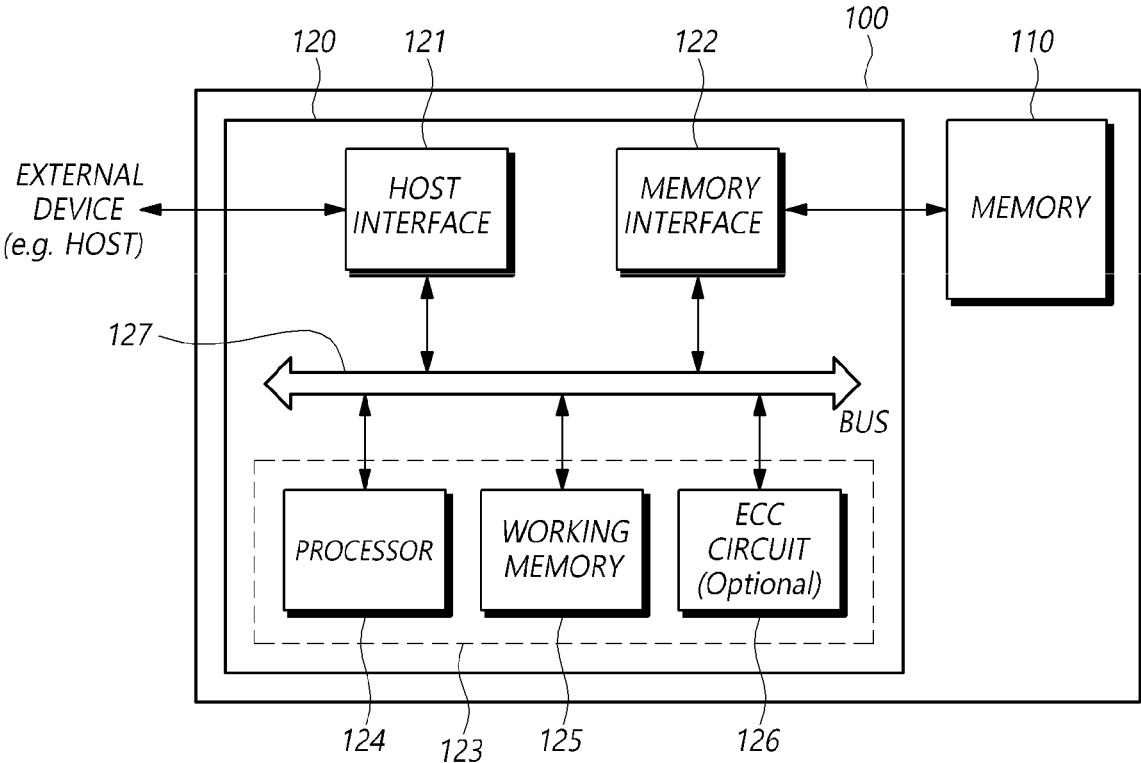
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
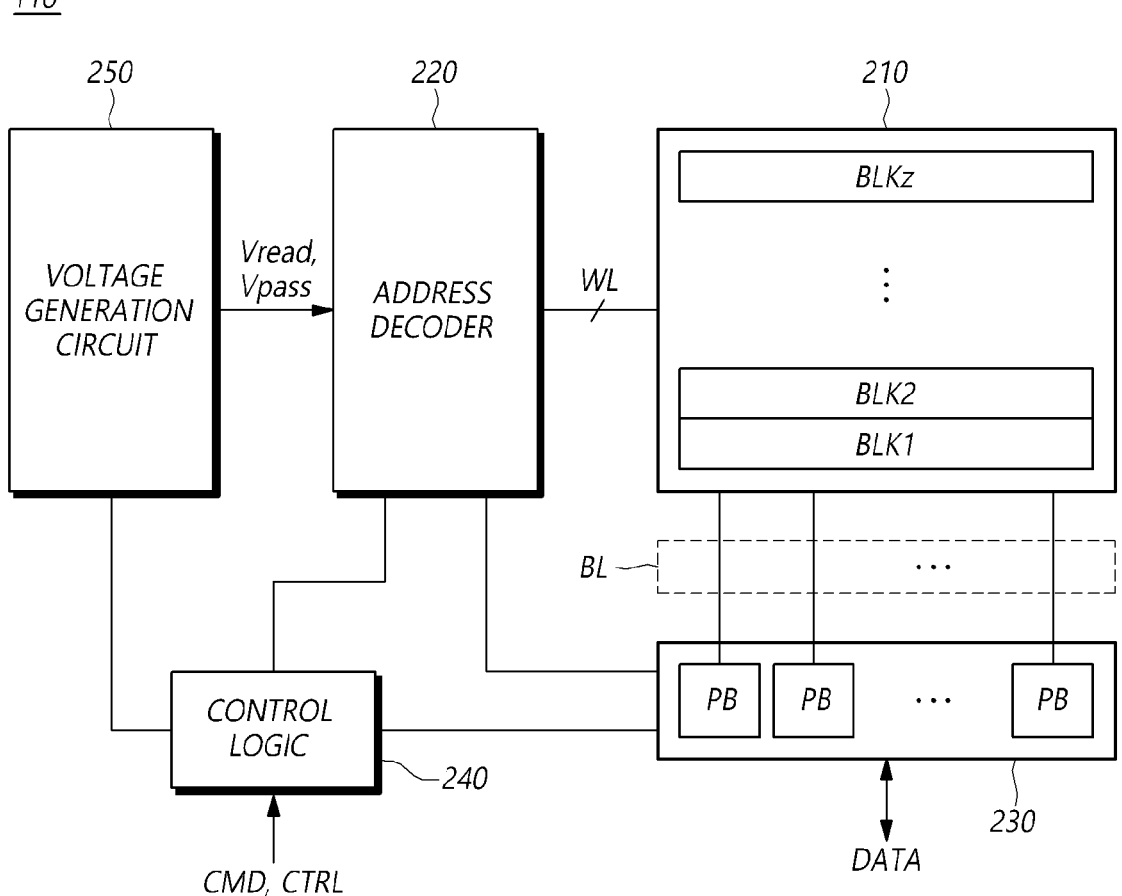
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC)

that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
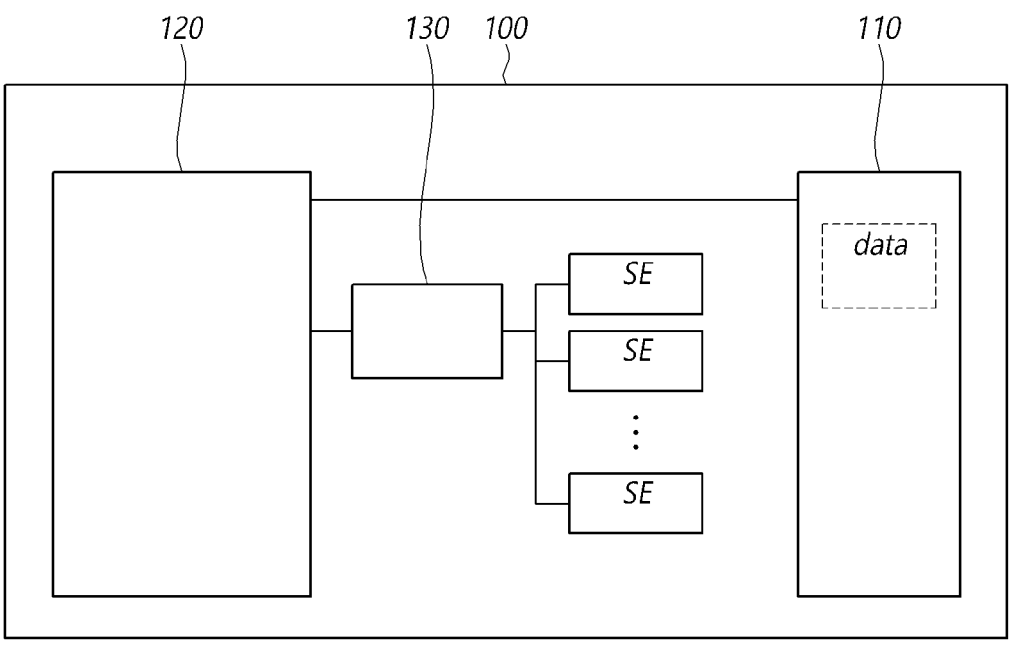
FIG. 3 is a diagram showing the schematic structure of a storage device based on an embodiment of the disclosed technology.

FIG. 3 is a diagram showing the schematic structure of a storage device 100 based on an embodiment of the disclosed technology.

Referring to FIG. 3, the storage device 100 may include a memory 110, a controller 120, a search engine manager 130, and a plurality of search engines SE.

The memory 110 may store data. Data may be identified through physical address areas of the memory 110.

The controller 120 may read data from the memory 110 on the basis of N (N is a natural number) number of target map segments. The N number of target map segments may indicate N number of target logical address areas corresponding to data stored in the memory 110.

Figure 4:
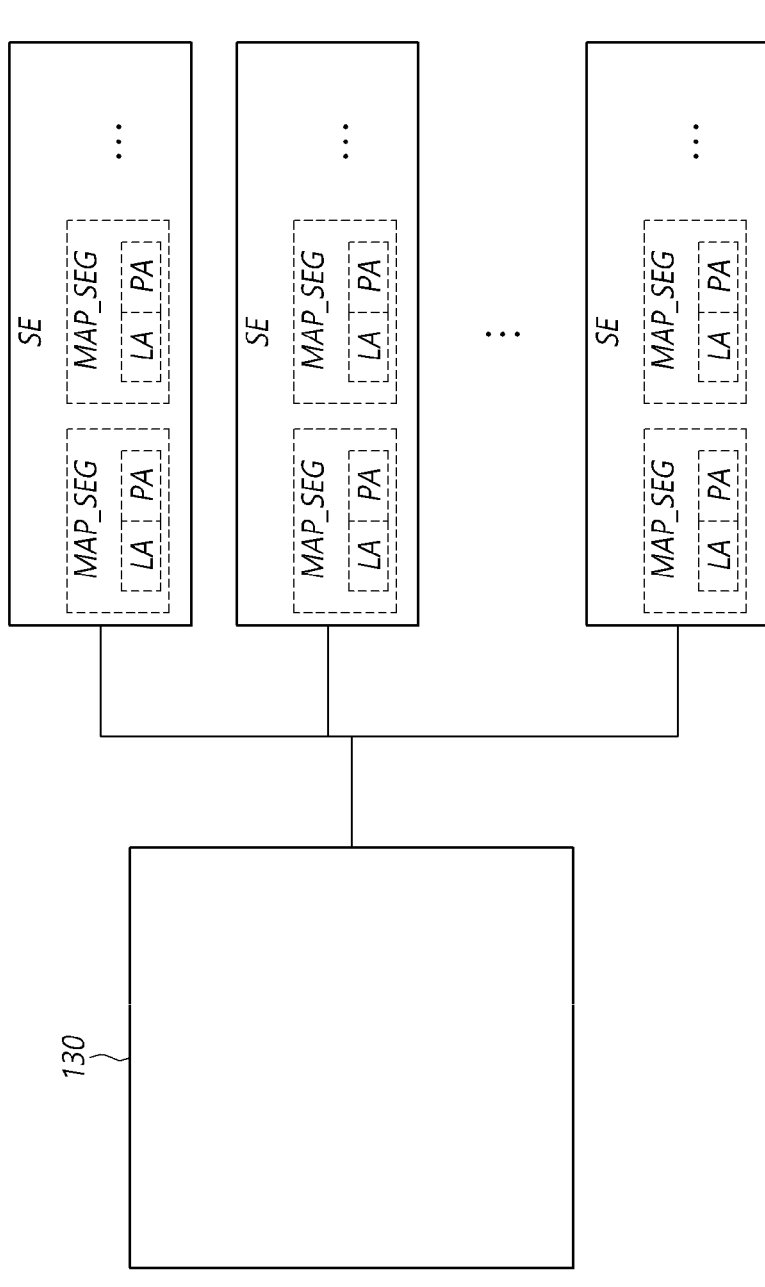
FIG. 4 is a diagram showing the structures of a plurality of search engines and a search engine manager in accordance with an embodiment of the disclosed technology.

The search engine manager 130 may determine the N number of target map segments using the plurality of search engines SE. In FIG. 4, the search engine manager 130 and the plurality of search engines SE will be described in detail.

For example, the controller 120 may transmit, to the search engine manager 130, a command or a signal which requests the determination of the N number of target map segments. The command or the signal may include information on N number of target logical address areas.

The search engine manager 130 may transmit information on the N number of target map segments to the controller 120 in response to the command or the signal received. On the basis of the received information on the N number of target map segments, the controller 120 may access the N number of target map segments stored in the plurality of search engines SE.

Through this, the controller 120 may search for the N number of target map segments more quickly and efficiently than directly searching for the N number of target map segments in the plurality of search engines SE. As a result, the controller 120 may minimize an overhead that occurs in the process of searching for the N number of target map segments.

The search engine manager 130 as hardware may be implemented in various ways.

For example, the search engine manager 130 may include a memory unit (not shown) for storing the information on the N number of target map segments. The memory unit may be a volatile memory or a nonvolatile memory.

For example, the search engine manager 130 may include a transmission interface circuit (not shown) for transmitting information on target map segments to the controller 120.

For example, the search engine manager 130 may include a processing circuit (not shown) to perform an operation of determining the N number of target map segments.

In FIG. 3, a case where the search engine manager 130 and the plurality of search engines SE are located outside the controller 120 is described as an example. However, the search engine manager 130 and the plurality of search engines SE may be included in the controller 120.

FIG. 4 is a diagram showing the structures of the plurality of search engines SE and the search engine manager 130 in accordance with an embodiment of the disclosed technology.

Referring to FIG. 4, each of the plurality of search engines SE may store a plurality of map segments MAP_SEG. To this end, each of the plurality of search engines SE may include a memory unit (e.g., an SRAM or one or more registers) capable of storing the map segments MAP_SEG.

Each of the plurality of map segments MAP_SEG may indicate the mapping relationship between a logical address area LA and a physical address area PA. The size of each of the logical address area LA and the physical address area PA which are mapped to each other may be a preset unit size (e.g., 4 KB). Data corresponding to the logical address area included in one map segment is stored in the physical address area mapped to the corresponding logical address area in the memory 110.

A logical address area may be identified by a start logical address and the unit size. For example, when a start logical address is 0x10000 and the unit size is 4 KB, a logical address area may be 0x10000 to 0x10FFF.

Likewise, a physical address area may be identified by a start physical address and the unit size. For example, when a start physical address is 0x20000 and the unit size is 4 KB, a physical address area may be 0x20000 to 0x20FFF.

At least two map segments corresponding to the same logical address area may be stored in different search engines. The physical address areas included in the at least two map segments stored in the different search engines may be different from each other.

The search engine manager 130 may determine the N number of target map segments described above with reference to FIG. 3 among the map segments MAP_SEG stored in the plurality of search engines SE, where N is a natural number. Hereinafter, this will be described in detail.

Figure 5:
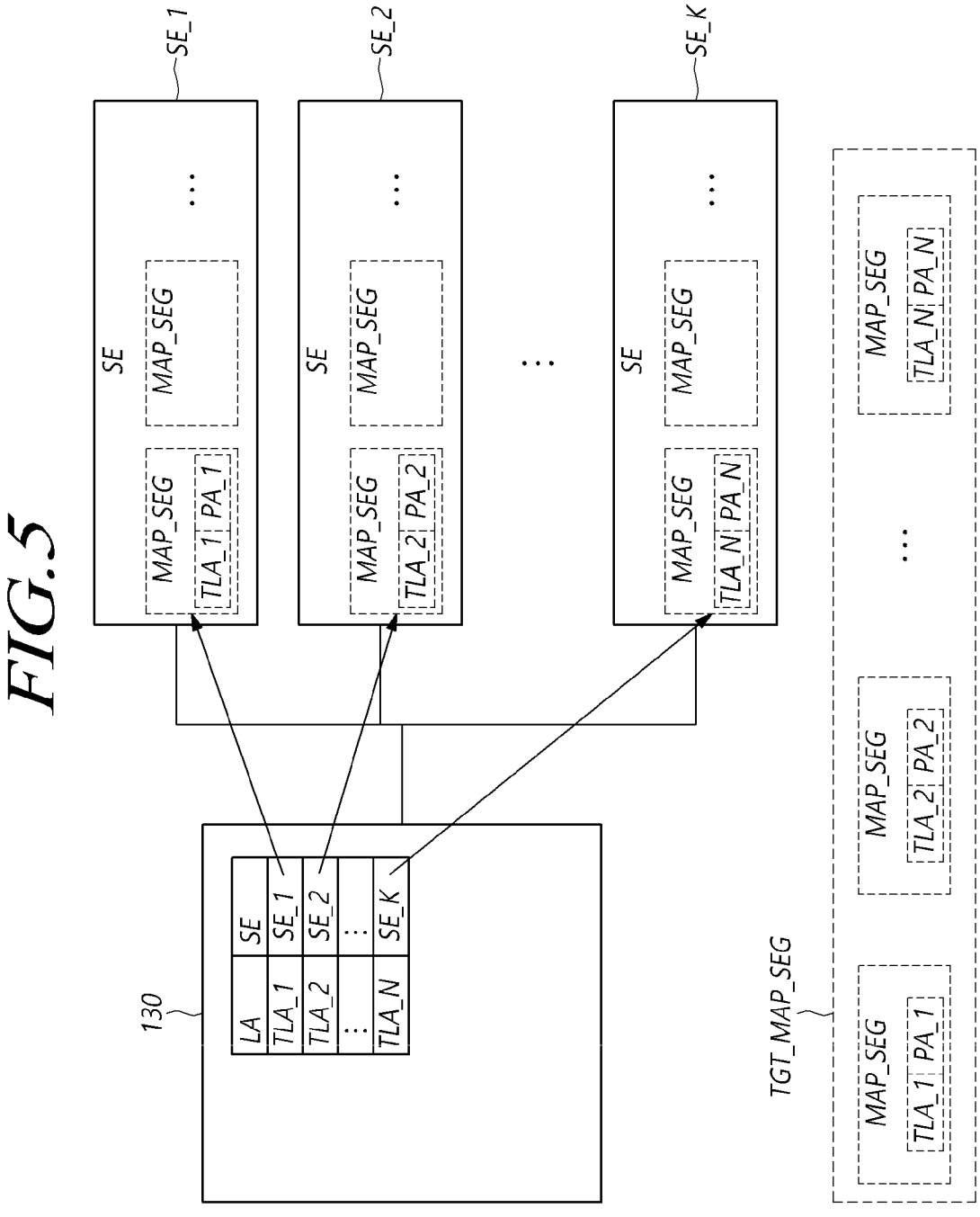
FIG. 5 is a diagram showing an example of an operation in which the search engine manager in accordance with an embodiment of the disclosed technology determines N number of target map segments.

FIG. 5 is a diagram showing an example of an operation in which the search engine manager 130 in accordance with the embodiment of the disclosed technology determines N number of target map segments TGT_MAP_SEG.

Referring to FIG. 5, the search engine manager 130 may select N number of target map segments TGT_MAP_SEG indicating N number of target logical address areas TLA_1, TLA_2, . . . and TLA_N, respectively, among the map segments MAP_SEG stored in the plurality of search engines SE_1 through SE_K, where K is a natural number greater than or equal to 2.

For example, the search engine manager 130 may select a target map segment indicating the target logical address area TLA_1 among the map segments stored in a first search engine SE_1.

The search engine manager 130 may select a target map segment indicating the target logical address area TLA_2 among the map segments stored in a second search engine SE_2.

The search engine manager 130 may select a target map segment indicating the target logical address area TLA_N among the map segments stored in a Kth search engine SE_K.

The search engine manager 130 may manage, in various ways, in which search engine among the plurality of search engines SE each of the N number of target map segments TGT_MAP_SEG is stored.

For example, the search engine manager 130 may generate a bitmap of an N-bit size for each of the plurality of search engines SE. Each bit of a bitmap corresponding to a search engine may indicate whether a target map segment indicating a target logical address area corresponding to the corresponding bit among the N number of target logical address areas is stored in the corresponding search engine.

When it is determined that a target map segment indicating a target logical address area is among map segments stored in a certain search engine, the search engine manager 130 may set a bit corresponding to the corresponding target logical address area in a bitmap corresponding to the corresponding search engine.

Hereinafter, a specific embodiment in which the search engine manager 130 determines the N number of target map segments TGT_MAP_SEG will be described.

In the embodiment of the disclosed technology, the search engine manager 130 may determine the N number of target map segments TGT_MAP_SEG by selecting the map segments MAP_SEG stored in the plurality of search engines SE on the basis of priorities among the plurality of search engines SE.

As described above, a plurality of map segments corresponding to the same logical address area may be stored in different search engines SE. In order to determine that a map segment stored in which search engine among a plurality of map segments corresponding to the same logical address area is to be included in the plurality of target map segments TGT_MAP_SEG, the search engine manager 130 may consider the priorities of the plurality of search engines SE.

Figure 6:
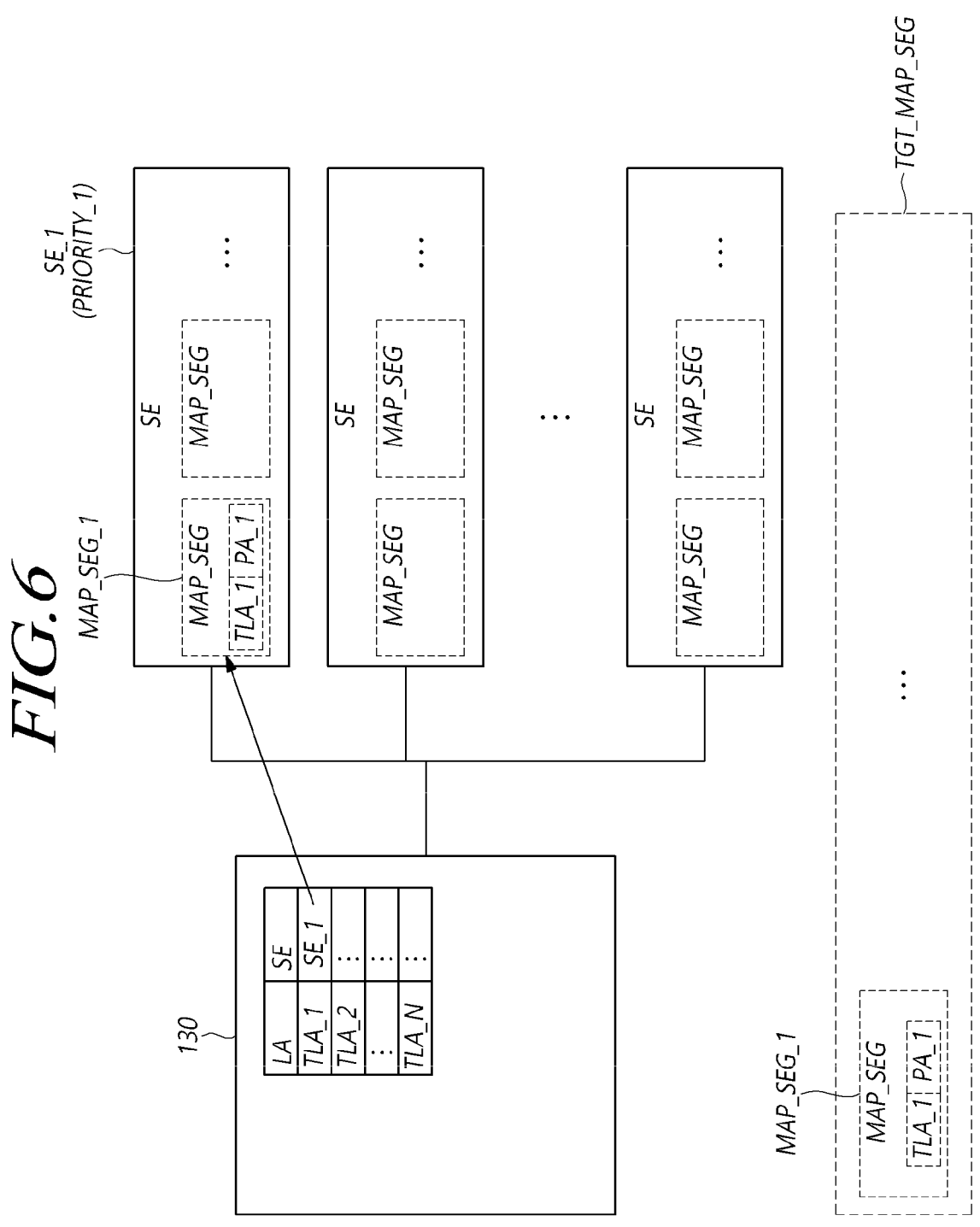
FIG. 6 is a diagram showing an example of an operation in which the search engine manager in accordance with an embodiment of the disclosed technology selects a first map segment as one of the N number of target map segments.

FIG. 6 is a diagram showing an example of an operation in which the search engine manager 130 in accordance with the embodiment of the disclosed technology selects a first map segment MAP_SEG_1 as one of the N number of target map segments TGT_MAP_SEG.

Referring to FIG. 6, the search engine manager 130 may determine whether the first map segment MAP_SEG_1 indicating a first target logical address area TLA_1 among the above-described N number of target logical address areas TLA_1, TLA_2, . . . and TLA_N is stored in a first search engine SE_1 having a first priority PRIORITY_1 among the plurality of search engines SE. The first priority PRIORITY_1 is a highest priority among the priorities of the plurality of search engines SE. That is to say, the first priority PRIORITY_1 may indicate that the priority of the first search engine SE_1 is highest among the priorities of the plurality of search engines SE.

When the first map segment MAP_SEG_1 is stored in the first search engine SE_1, the search engine manager 130 may select the first map segment MAP_SEG_1 as one of the N number of target map segments TGT_MAP_SEG.

In other words, when the first map segment MAP_SEG_1 is stored in the first search engine SE_1, the search engine manager 130 may select the first map segment MAP_SEG_1 from the first search engine SE_1 regardless of whether other map segments indicating the first target logical address area TLA_1 are stored in other search engines. This is because the priority of the first search engine SE_1 is highest among the priorities of the plurality of search engines.

When the search engine manager 130 generates a bitmap of an N-bit size for each of the plurality of search engines SE, the search engine manager 130 may set a bit corresponding to the first target logical address area TLA_1 in a bitmap corresponding to the first search engine SE_1, and may reset bits corresponding to the first target logical address area TLA_1 in bitmaps corresponding to the remaining search engines except the first search engine SE_1. Through this, the search engine manager 130 may indicate that the map segment corresponding to the first target logical address area TLA_1 may be searched for in the first search engine SE_1.

Figure 7:
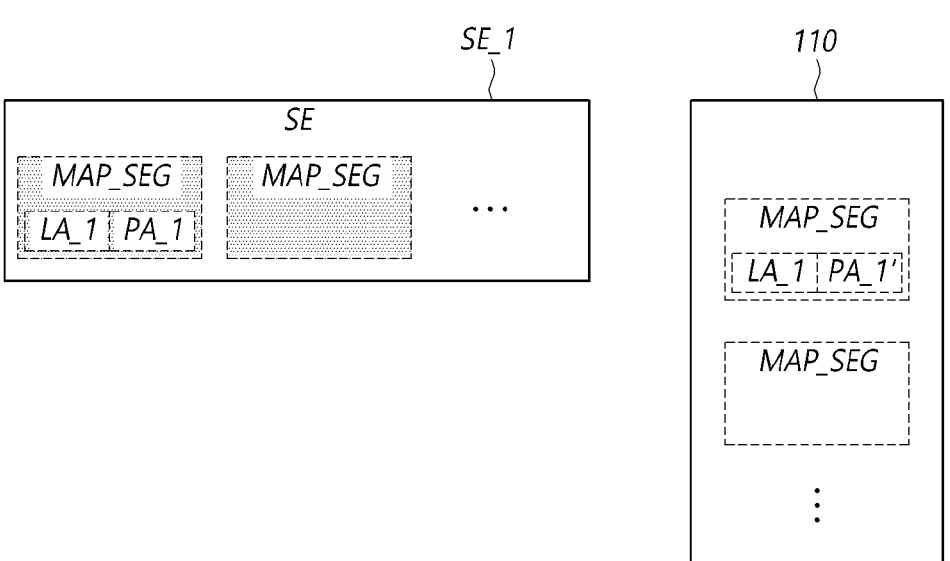
FIG. 7 is a diagram showing an example of map segments which are stored in a first search engine in accordance with an embodiment of the disclosed technology.

FIG. 7 is a diagram showing an example of map segments MAP_SEG which are stored in the first search engine SE_1 in accordance with an embodiment of the disclosed technology.

Referring to FIG. 7, the map segments MAP_SEG stored in the first search engine SE_1 are map segments which have not been written to the memory 110 after being updated by the controller 120.

For example, the controller 120 may update a specific map segment when writing data requested by a host or performing a background operation (e.g., garbage collection). When updating the map segment, the value of the physical address area included in the corresponding map segment may be changed. In the embodiment of the disclosed technology, an updated map segment may be stored in the first search engine SE_1.

In FIG. 7, among the map segments MAP_SEG stored in the first search engine SE_1, the physical address of a map segment MAP_SEG corresponding to a logical address area LA_1 is updated to PA_1. However, among map segments MAP_SEG stored in the memory 110, the physical address of a map segment MAP_SEG corresponding to the logical address area LA_1 is PA_1'.

Figure 8:
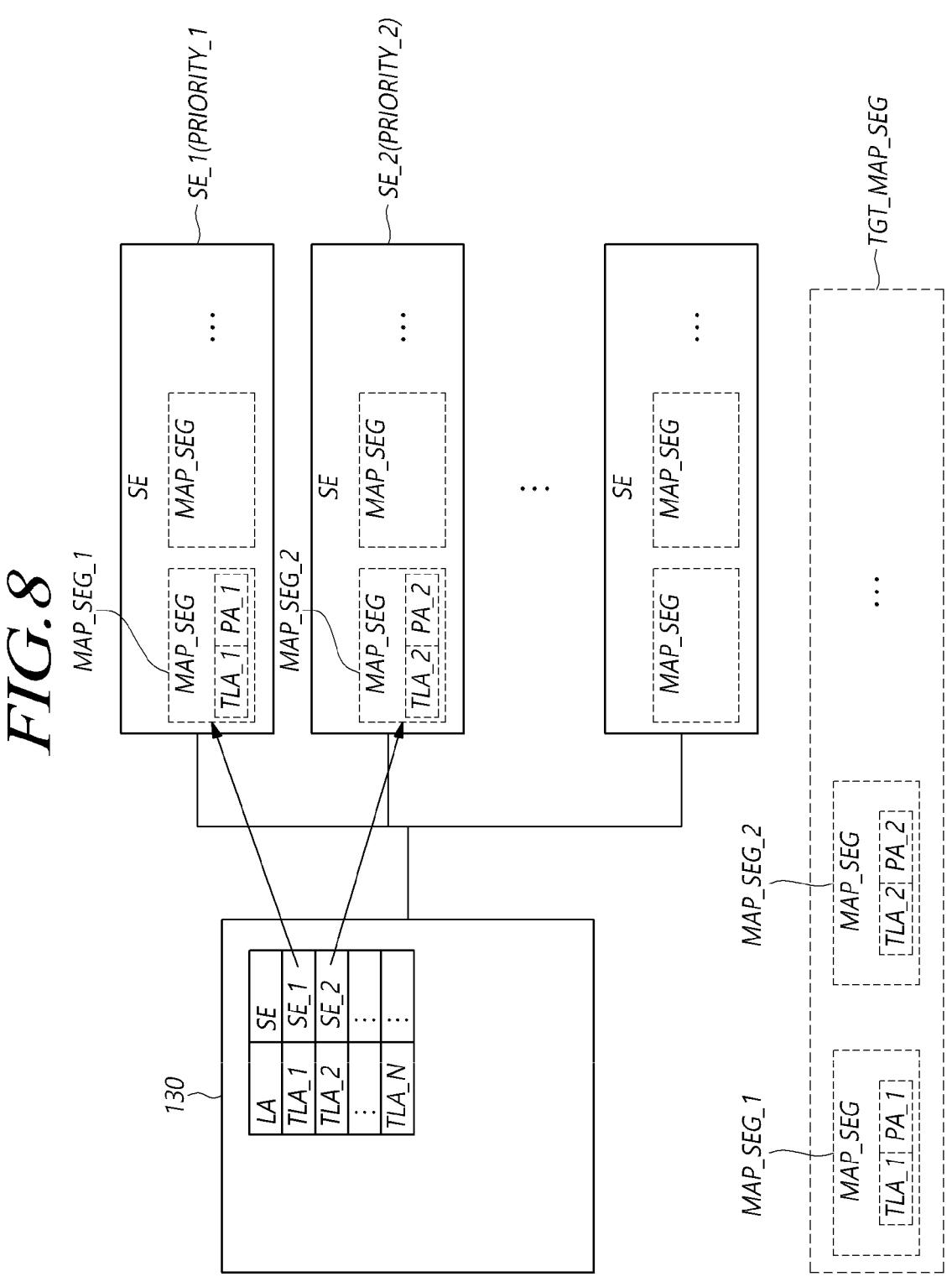
FIG. 8 is a diagram showing an example of an operation in which the search engine manager in accordance with the embodiment of the disclosed technology selects a second map segment as one of the N number of target map segments.

FIG. 8 is a diagram showing an example of an operation in which the search engine manager 130 in accordance with the embodiment of the disclosed technology selects a second map segment MAP_SEG_2 as one of the N number of target map segments MAP_SEG_2.

Referring to FIG. 8, the search engine manager 130 determines whether the second map segment MAP_SEG_2 indicating a second target logical address area TLA_2 among the above-described N number of target logical address areas TLA_1, TLA_2, . . . and TLA_N is not stored in the first search engine SE_1 having the first priority PRIORITY_1 among the plurality of search engines SE and whether the second map segment MAP_SEG_2 indicating the second target logical address area TLA_2 is stored in a second search engine SE_2 having a second priority PRIORITY_2 among the plurality of search engines SE. The second priority PRIORITY_2 is lower than the first priority PRIORITY_1.

When the second map segment MAP_SEG_2 is not stored in the first search engine SE_1 and is stored in the second search engine SE_2, the search engine manager 130 may select the second map segment MAP_SEG_2 as one of the N number of target map segments TGT_MAP_SEG.

Namely, a map segment stored in the second search engine SE_2 may be included in the target map segments TGT_MAP_SEG only when a map segment corresponding to the same logical address area does not exist in the first search engine SE_1. This is because the priority of the second search engine SE_2 is lower than that of the first search engine SE_1.

When the search engine manager 130 generates a bitmap of an N-bit size for each of the plurality of search engines SE, the search engine manager 130 may set a bit corresponding to the second target logical address area TLA_2 in a bitmap corresponding to the second search engine SE_2. Furthermore, when there are search engines with priorities lower than the priority of the second search engine SE_2, the search engine manager 130 may reset bits corresponding to the second target logical address area TLA_2 in bitmaps corresponding to the search engines with the priorities lower than the priority of the second search engine SE_2. Through this, the search engine manager 130 may indicate that the map segment corresponding to the second target logical address area TLA_2 may be searched for in the second search engine SE_2.

Figure 9:
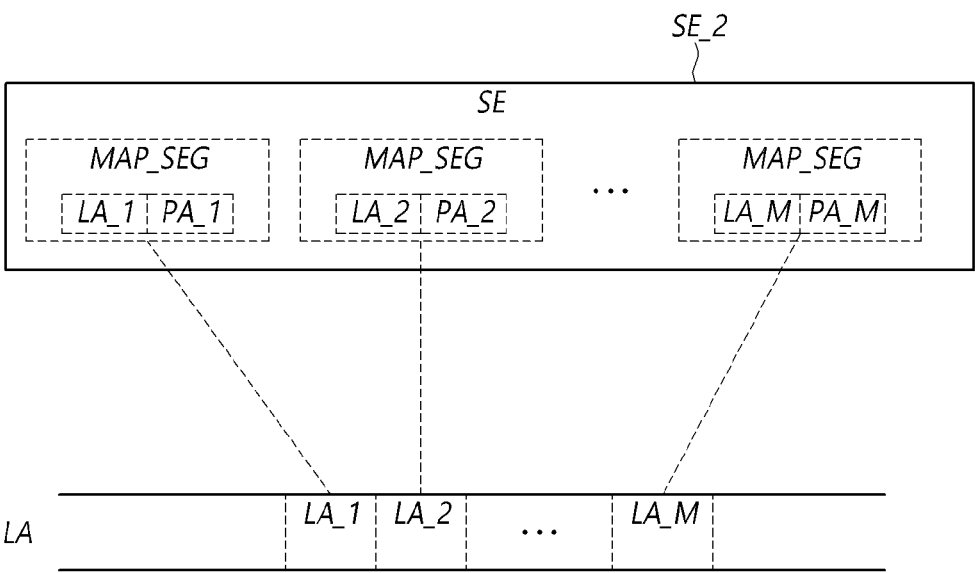
FIG. 9 is a diagram showing an example of map segments which are stored in a second search engine in accordance with an embodiment of the disclosed technology.

FIG. 9 is a diagram showing an example of map segments MAP_SEG which are stored in the second search engine SE_2 in accordance with an embodiment of the disclosed technology.

Referring to FIG. 9, logical address areas LA_1, LA_2, . . . and LA_M corresponding to the map segments MAP_SEG stored in the second search engine SE_2 are consecutive to each other.

Accordingly, the second search engine SE_2 may search for physical address areas PA_1, PA_2, . . . and PA_M corresponding to the consecutive logical address areas LA_1, LA_2, . . . and LA_M.

Figure 10:
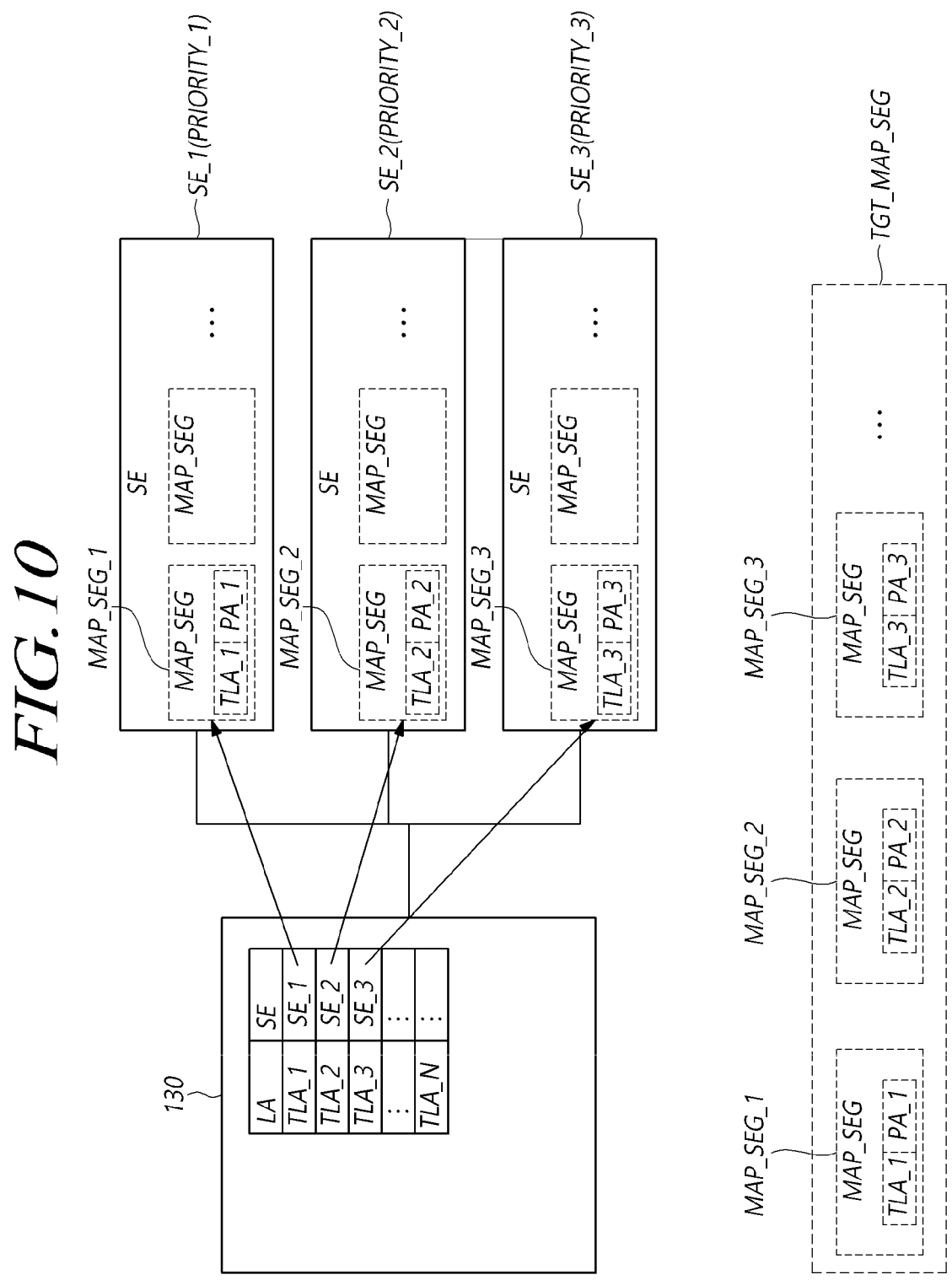
FIG. 10 is a diagram showing an example of an operation in which the search engine manager in accordance with the embodiment of the disclosed technology selects a third map segment as one of the N number of target map segments.

FIG. 10 is a diagram showing an example of an operation in which the search engine manager 130 in accordance with the embodiment of the disclosed technology selects a third map segment MAP_SEG_3 as one of the N number of target map segments TGT_MAP_SEG.

In FIG. 10, the number of the plurality of search engines SE is three or more.

Referring to FIG. 10, the search engine manager 130 determines whether the third map segment MAP_SEG_3 indicating a third target logical address area TLA_3 among the above-described N number of target logical address areas TLA_1, TLA_2, . . . and TLA_N is not stored in the first search engine SE_1 having the first priority PRIORITY_1 among the plurality of search engines SE, whether the third map segment MAP_SEG_3 is not stored in the second search engine SE_2 having the second priority PRIORITY_2 among the plurality of search engines SE, and whether the third map segment MAP_SEG_3 is stored in a third search engine SE_3 having a third priority PRIORITY_3 among the plurality of search engines SE. The third priority PRIORITY_3 is lower than the first priority PRIORITY_1 and the second priority PRIORITY_2.

When the third map segment MAP_SEG_3 is not stored in the first search engine SE_1 and the second search engine SE_2 and is stored in the third search engine SE_3, the search engine manager 130 may select the third map segment MAP_SEG_3 as one of the N number of target map segments TGT_MAP_SEG.

That is to say, a map segment stored in the third search engine SE_3 may be included in the target map segments TGT_MAP_SEG only when a map segment corresponding to the same logical address area does not exist in the first search engine SE_1 and the second search engine SE_2. This is because the priority of the third search engine SE_3 is lower than that of the first search engine SE_1 and that of the second search engine SE_2.

When the search engine manager 130 generates a bitmap of an N-bit size for each of the plurality of search engines SE, the search engine manager 130 may set a bit corresponding to the third target logical address area TLA_3 in a bitmap corresponding to the third search engine SE_3. Furthermore, when there are search engines with priorities lower than the priority of the third search engine SE_3, the search engine manager 130 may reset bits corresponding to the third target logical address area TLA_3 in bitmaps corresponding to the search engines with the priorities lower than the priority of the third search engine SE_3. Through this, the search engine manager 130 may indicate that the map segment corresponding to the third target logical address area TLA_3 may be searched for in the third search engine SE_3.

Figure 11:
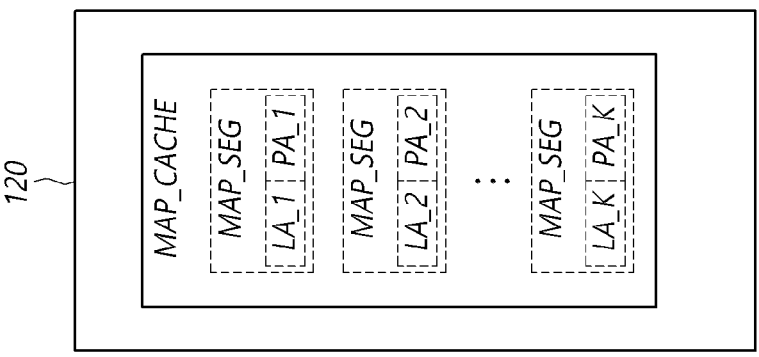
FIG. 11 is a diagram showing an example of map segments which are stored in a third search engine in accordance with an embodiment of the disclosed technology.
Figure 11:
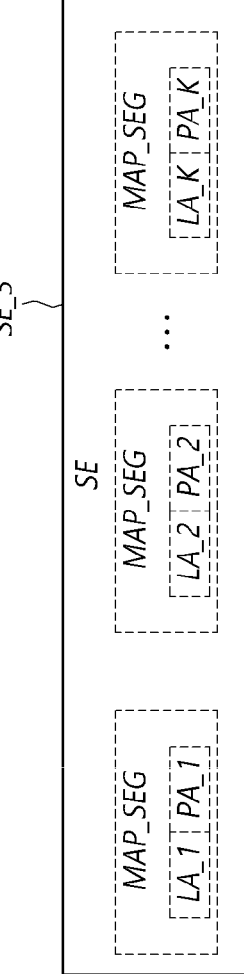

FIG. 11 is a diagram showing an example of map segments MAP_SEG which are stored in the third search engine SE_3 in accordance with an embodiment of the disclosed technology.

In FIG. 11, the controller 120 may include a map cache MAP_CACHE capable of caching a plurality of map segments MAP_SEG.

The map segments MAP_SEG stored in the third search engine SE_3 are map segments which are cached in the map cache MAP_CACHE. In other words, map segments corresponding to K number of logical address areas LA_1, LA_2, . . . and LA_K, respectively, are cached in the map cache MAP_CACHE.

Hereinafter, an example in which the above-described search engine manager 130 determines target map segments TGT_MAP_SEG will be described.

Figure 12:
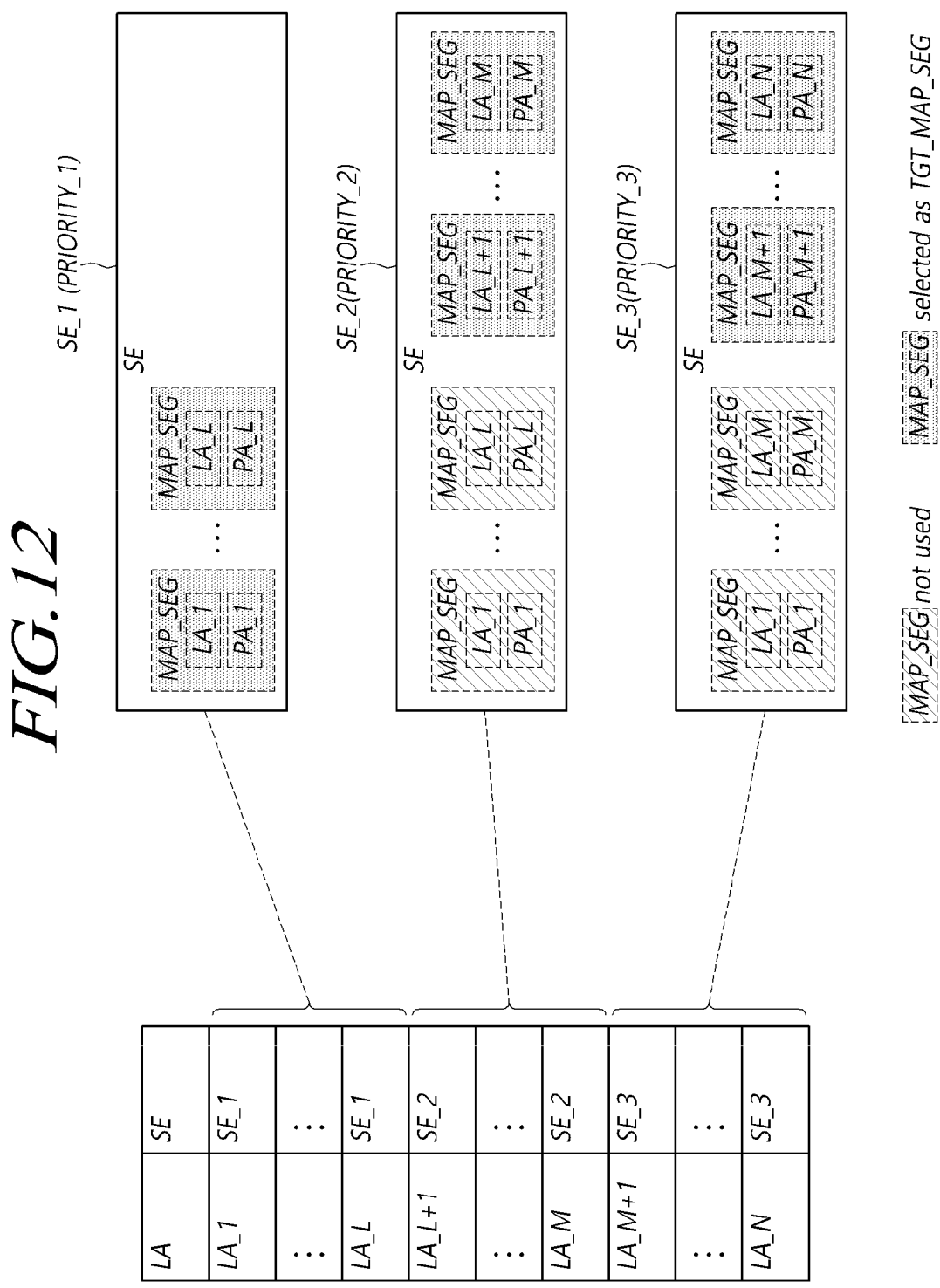
FIG. 12 is a diagram showing an example of the configuration of target map segments in accordance with an embodiment of the disclosed technology.

FIG. 12 is a diagram showing an example of the configuration of target map segments TGT_MAP_SEG in accordance with an embodiment of the disclosed technology.

In FIG. 12, the search engine manager 130 may determine N number of target map segments on the basis of three search engines SE_1, SE_2 and SE_3.

In FIG. 12, a first search engine SE_1 stores L number of map segments, and logical address areas corresponding to the L number of map segments are LA_1, LA_2, . . . and LA_L.

A second search engine SE_2 stores M number of map segments, and logical address areas corresponding to the M number of map segments are LA_1, LA_2, . . . and LA_M. In this example, M is greater than L, but embodiments are not limited thereto.

A third search engine SE_3 stores N number of map segments, and logical address areas corresponding to the N number of map segments are LA_1, LA_2, . . . and LA_N. In this example, N is greater than M, but embodiments are not limited thereto. Each of the first through third search engines SE_1 through SE_3 may also include map segments not shown in FIG. 12 that are not pertinent to the illustrated example and that are therefore not shown.

The priority of the first search engine SE_1 is a first priority PRIORITY_1, the priority of the second search engine SE_2 is a second priority PRIORITY_2, and the priority of the third search engine SE_3 is a third priority PRIORITY_3. The first priority PRIORITY_1 is a priority higher than the second priority PRIORITY_2 and the third priority PRIORITY_3, and the second priority PRIORITY_2 is a priority higher than the third priority PRIORITY_3.

In FIG. 12, when the search engine manager 130 selects a specific map segment among map segments stored in a specific search engine among the plurality of search engines SE as one of N number of target map segments TGT_MAP_SEG, the search engine manager 130 may set, to an unused state, the corresponding specific map segment stored in a search engine having a priority lower than the priority of the corresponding specific search engine among the plurality of search engines SE.

In FIG. 12, the map segments corresponding to the logical address areas LA_1, LA_2, . . . and LA_L exist in all of the first search engine SE_1, the second search engine SE_2 and the third search engine SE_3. The search engine manager 130 may indicate that the map segments corresponding to the logical address areas LA_1, LA_2, . . . and LA_L stored in the first search engine SE_1 with the highest priority are included in the target map segments TGT_MAP_SEG. The map segments corresponding to the logical address areas LA_1, LA_2, . . . and LA_L in the second search engine SE_2 and the third search engine SE_3 with the lower priorities than the priority of the first search engine SE_1 may be set to an unused state.

The map segments corresponding to the logical address areas LA_L+1, . . . and LA_M exist in both of the second search engine SE_2 and the third search engine SE_3. The search engine manager 130 may indicate that the map segments corresponding to the logical address areas LA_L+1, . . . and LA_M stored in the second search engine SE_2 with the higher priority are included in the target map segments TGT_MAP_SEG. The map segments corresponding to the logical address areas LA_L+1, . . . and LA_M in the third search engine SE_3 with the lower priority than the priority of the second search engine SE_2 may be set to an unused state.

The map segments corresponding to the logical address areas LA_M+1, . . . and LA_N exist only in the third search engine SE_3. The search engine manager 130 may indicate that the map segments corresponding to the logical address areas LA_M+1, . . . and LA_N stored in the third search engine SE_3 are included in the target map segments TGT_MAP_SEG.

Figure 13:
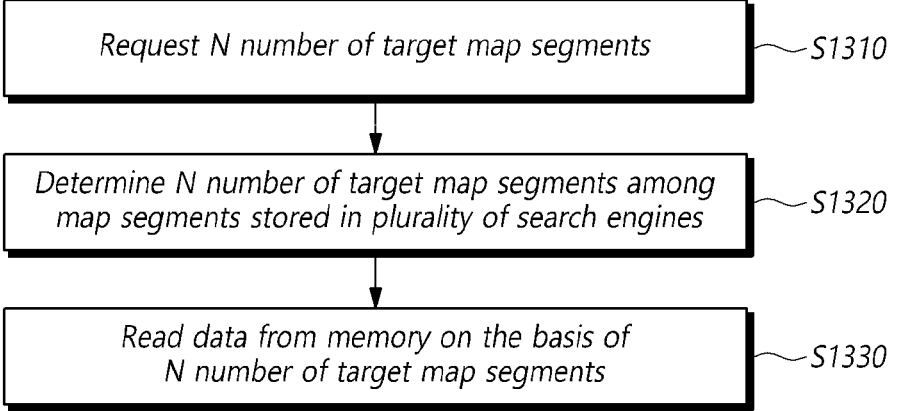
FIG. 13 is a diagram showing a method for operating a storage device based on an embodiment of the disclosed technology.

FIG. 13 is a diagram showing a method for operating the storage device 100 based on an embodiment of the disclosed technology.

Referring to FIG. 13, the method for operating the storage device 100 may include a step S1310 of requesting N number of target map segments TGT_MAP_SEG indicating N number of target logical address areas TLA_1, TLA_2, . . . and TLA_N corresponding to data stored in the memory 110.

The method for operating the storage device 100 may include a step S1320 of determining the N number of target map segments TGT_MAP_SEG from the plurality of search engines SE. Each of the plurality of search engines SE may store a plurality of map segments MAP_SEG, and each of the plurality of map segments MAP_SEG may indicate the mapping relationship between a logical address area and a physical address area.

In the step S1320, the N number of target map segments TGT_MAP_SEG may be determined by selecting map segments stored in the plurality of search engines SE on the basis of the priorities of the plurality of search engines SE.

For example, in the step S1320, when a first map segment MAP_SEG_1 indicating a first target logical address area TLA_1 among the N number of target logical address areas TLA_1, TLA_2, . . . and TLA_N is stored in the first search engine SE_1 with the first priority PRIORITY_1 among the plurality of search engines SE, the first map segment MAP_SEG_1 may be selected as one of the N number of target map segments TGT_MAP_SEG. The first priority PRIORITY_1 is a highest priority among the priorities of the plurality of search engines SE.

The map segments stored in the first search engine SE_1 may be map segments which have not been written to the memory 110 after being updated.

For example, in the step S1320, when a second map segment MAP_SEG_2 indicating a second target logical address area TLA_2 among the N number of target logical address areas TLA_1, TLA_2, . . . and TLA_N is not stored in the first search engine SE_1 and is stored in the second search engine SE_2 with the second priority PRIORITY_2 among the plurality of search engines SE, the second map segment MAP_SEG_2 may be selected as one of the N number of target map segments TGT_MAP_SEG. The second priority PRIORITY_2 is a priority lower than the first priority PRIORITY_1.

Logical address areas corresponding to the map segments stored in the second search engine SE_2 may be consecutive to each other.

For example, in the step S1320, when a third map segment MAP_SEG_3 indicating a third target logical address area TLA_3 among the N number of target logical address areas TLA_1, TLA_2, . . . and TLA_N is not stored in the first search engine SE_1 and the second search engine SE_2 and is stored in the third search engine SE_3 with the third priority PRIORITY_3 among the plurality of search engines SE, the third map segment MAP_SEG_3 may be selected as one of the N number of target map segments TGT_ MAP_SEG. The third priority PRIORITY_3 is a priority lower than the first priority PRIORITY_1 and the second priority PRIORITY_2.

The map segments stored in the third search engine SE_3 may be map segments which are cached in the map cache MAP_CACHE capable of caching a plurality of map segments.

For example, in the step S1320, when a first map segment MAP_SEG_1 stored in the first search engine SE_1 among the plurality of search engines SE is selected as one of the N number of target map segments TGT_MAP_SEG, the first map segment MAP_SEG_1 stored in a search engine having a priority lower than the priority of the first search engine SE_1 among the plurality of search engines SE may be set to an unused state.

The method for operating the storage device 100 may include a step S1330 of reading the data from the memory 110 on the basis of the N number of target map segments TGT_MAP_SEG determined in the step S1320.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device including a processor, the storage device comprising:
   a memory configured to store data;
   a plurality of search engines each configured to be able to store a plurality of map segments, each of the map segments indicating a respective mapping relationship between a logical address area and a physical address area;
   a search engine manager configured to
      receive from a controller a request indicating N number of logical address areas corresponding to the data,
      determine, from among map segments stored in the plurality of search engines and using information regarding the search engines stored in the search engine manager, N number of target map segments respectively corresponding to the N number of target logical address areas corresponding to the data, and
      transmit information on the N number of target map segments to the controller; and the controller configured to read the data from the memory on the basis of the N number of target map segments,
   wherein N is a natural number, and
   wherein, among map segments stored in the plurality of search engines, at least two map segments corresponding to the same logical address area are stored in different search engines having different priorities.

2. The storage device according to claim 1, wherein the search engine manager determines the N number of target map segments by selecting map segments stored in the plurality of search engines on the basis of respective priorities of the plurality of search engines.

3. The storage device according to claim 2, wherein
   when a first map segment indicating a first target logical address area among the N number of target logical address areas is stored in a first search engine having a first priority among the plurality of search engines, the search engine manager selects the first map segment as one of the N number of target map segments, and
   the first priority is a highest priority among the priorities of the plurality of search engines.

4. The storage device according to claim 3, wherein map segments stored in the first search engine are map segments which are not written to the memory after being updated by the controller.

5. The storage device according to claim 3, wherein
   when a second map segment indicating a second target logical address area among the N number of target logical address areas is not stored in the first search engine and is stored in a second search engine having a second priority among the plurality of search engines, the search engine manager selects the second map segment as one of the N number of target map segments, and
   the second priority is a priority lower than the first priority.

6. The storage device according to claim 5, wherein logical address areas corresponding to map segments stored in the second search engine are consecutive to each other.

7. The storage device according to claim 5, wherein
   the number of the plurality of search engines is three or more,
   when a third map segment indicating a third target logical address area among the N number of target logical address areas is not stored in the first search engine, is not stored in the second search engine, and is stored in a third search engine having a third priority among the plurality of search engines, the search engine manager selects the third map segment as one of the N number of target map segments, and
   the third priority is a priority lower than the first priority and the second priority.

8. The storage device according to claim 7, wherein
   the controller includes a map cache capable of caching a plurality of map segments, and
   map segments stored in the third search engine are map segments which are cached in the map cache.

9. The storage device according to claim 2, wherein, when selecting a first map segment stored in a first search engine among the plurality of search engines as one of the N number of target map segments, the search engine manager sets, to an unused state, a first map segment stored in a search engine having a priority lower than the first search engine among the plurality of search engines.

10. A method for operating a storage device including a processor, a search engine manager, and a plurality of search engines each capable of storing a plurality of map segments, the method comprising:

requesting, from the search engine manager, N number of target map segments indicating N number of target logical address areas corresponding to data stored in a memory;

determining, by the search engine manager using information regarding the search engines stored in the search engine manager, the N number of target map segments from among map segments stored in the plurality of search engines, each of the map segments indicating a respective mapping relationship between a logical address area and a physical address area; and reading the data from the memory on the basis of the N number of target map segments, wherein N is a natural number, and wherein, among map segments stored in the plurality of search engines, at least two map segments corresponding to the same logical address area are stored in different search engines having different priorities.

11. The method according to claim 10, wherein the determining of the N number of target map segments determines the N number of target map segments by selecting map segments stored in the plurality of search engines on the basis of respective priorities of the plurality of search engines.

12. The method according to claim 11, wherein when a first map segment indicating a first target logical address area among the N number of target logical address areas is stored in a first search engine having a first priority among the plurality of search engines, the determining of the N number of target map segments selects the first map segment as one of the N number of target map segments, and the first priority is a highest priority among the priorities of the plurality of search engines.

13. The method according to claim 12, wherein map segments stored in the first search engine are map segments which are not written to the memory after being updated.

14. The method according to claim 12, wherein when a second map segment indicating a second target logical address area among the N number of target logical address areas is not stored in the first search engine and is stored in a second search engine having a second priority among the plurality of search engines, the determining of the N number of target map segments selects the second map segment as one of the N number of target map segments, and the second priority is a priority lower than the first priority.

15. The method according to claim 14, wherein logical address areas corresponding to map segments stored in the second search engine are consecutive to each other.

16. The method according to claim 14, wherein the number of the plurality of search engines is three or more, when a third map segment indicating a third target logical address area among the N number of target logical address areas is not stored in the first search engine, is not stored in the second search engine, and is stored in a third search engine having a third priority among the plurality of search engines, the determining of the N number of target map segments selects the third map segment as one of the N number of target map segments, and the third priority is a priority lower than the first priority and the second priority.

17. The method according to claim 16, wherein map segments stored in the third search engine are map segments which are cached in a map cache capable of caching a plurality of map segments.

18. The method according to claim 11, wherein, when selecting a first map segment stored in a first search engine among the plurality of search engines as one of the N number of target map segments, the determining of the N number of target map segments sets, to an unused state, a first map segment stored in a search engine having a priority lower than the first search engine among the plurality of search engines.

19. The method according to claim 10, wherein the information regarding the search engines stored in the search engine manager includes a bitmap for a search engine indicating whether a target map segment corresponding to target logical address is stored in that search engine.

20. The method according to claim 1, wherein the information regarding the search engines stored in the search engine manager includes a bitmap for a search engine indicating whether a target map segment corresponding to target logical address is stored in that search engine.

\* \* \* \* \*